United States Patent
Zhu et al.

(10) Patent No.: US 9,947,940 B2
(45) Date of Patent: Apr. 17, 2018

US009947940B2

(54) METHOD FOR PRODUCING FUEL CELL ELECTRODE CATALYST

(71) Applicant: SHOWA DENKO K.K., Minato-ku, Tokyo (JP)

(72) Inventors: Kunning Zhu, Tokyo (JP); Kunchan Lee, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/103,383

(22) PCT Filed: Aug. 26, 2014

(86) PCT No.: PCT/JP2014/072310
§ 371 (c)(1),
(2) Date: Jun. 10, 2016

(87) PCT Pub. No.: WO2015/098181
PCT Pub. Date: Jul. 2, 2015

(65) Prior Publication Data
US 2016/0359172 A1 Dec. 8, 2016

(30) Foreign Application Priority Data
Dec. 27, 2013 (JP) .................................. 2013-272262

(51) Int. Cl.
*B01J 23/00* (2006.01)
*H01M 4/92* (2006.01)
*H01M 4/88* (2006.01)

(52) U.S. Cl.
CPC ............. *H01M 4/921* (2013.01); *H01M 4/88* (2013.01); *H01M 4/925* (2013.01); *H01M 4/928* (2013.01)

(58) Field of Classification Search
CPC ...... H01M 4/921; H01M 4/928; H01M 4/925; H01M 4/88
USPC ........................................................ 502/325
See application file for complete search history.

(56) References Cited

U.S. PATENT DOCUMENTS

| 2006/0063062 A1* | 3/2006 | Zhou ................... B01D 53/945 502/300 |
| 2009/0029216 A1 | 1/2009 | Yamamoto |
| 2011/0257449 A1 | 10/2011 | Konishi et al. |

FOREIGN PATENT DOCUMENTS

| CN | 102264471 A | 11/2011 |
| EP | 2 368 634 A1 | 9/2011 |
| JP | 2004-178814 A | 6/2004 |
| JP | 2007-027096 A | 2/2007 |
| JP | 2010-027506 A | 2/2010 |
| JP | 2010-162443 A | 7/2010 |
| JP | 2011-089143 A | 5/2011 |
| JP | 2012-005969 A | 1/2012 |
| JP | 2012-035178 A | 2/2012 |
| JP | 2013-013878 A | 1/2013 |
| JP | 2013-116458 A | 6/2013 |
| WO | 2006/088194 A1 | 8/2006 |

OTHER PUBLICATIONS

Machine Translation of JP2010027506 Feb. 4, 2010.*
Geng Zhang et al., "Electrochemical preparation and characterization of PdPt nanocages with improved electrocatalytic activity toward oxygen reduction reaction", Electrochimica Acta, 2013, pp. 66-76, vol. 103.
International Search Report for PCT/JP2014/072310 dated Oct. 7, 2014.
Communication dated May 19, 2017 from the European Patent Office in counterpart Application No. 14874337.0.

* cited by examiner

*Primary Examiner* — Haytham Soliman
(74) *Attorney, Agent, or Firm* — Sughrue Mion, PLLC

(57) ABSTRACT

A method is provided for producing a platinum alloy-containing fuel cell electrode catalyst with high activity which is suited for its industrial mass-production. The method for producing a fuel cell electrode catalyst includes a step of preparing a dispersion in which particles of a fuel cell electrode catalyst precursor including a platinum alloy is dispersed in an electrolyte solution, and a step of alternately subjecting the dispersion to bubbling with an oxidizing gas and to bubbling with an inert gas or a reducing gas.

9 Claims, No Drawings

METHOD FOR PRODUCING FUEL CELL ELECTRODE CATALYST

CROSS REFERENCE TO RELATED APPLICATIONS

This application is a National Stage of International Application No. PCT/JP2014/072310 filed Aug. 26, 2014, claiming priority based on Japanese Patent Application No. 2013-272262 filed Dec. 27, 2013, the contents of all of which are incorporated herein by reference in their entirety.

TECHNICAL FIELD

The present invention relates to a method for producing a fuel cell electrode catalyst, and in more detail, a method for producing a fuel cell electrode catalyst comprising a platinum alloy.

BACKGROUND ART

A polymer electrolyte fuel cell is a fuel cell in which a solid polymer electrolyte is sandwiched by an anode and a cathode with the anode being supplied with a fuel and the cathode being supplied with oxygen or air and thereby oxygen is reduced at the cathode to produce electricity.

An electrode catalyst of the fuel cell has conventionally been platinum, and yet, to decrease use amount of the expensive platinum, its alternative, an alloy of platinum and other metal element(s), has been focused. There is a problem, however, with the other metal element(s):lower catalyst activity and durability than platinum (their elution during the operation of fuel cells).

To solve that problem, Non-Patent Literature 1 discloses a method for potential scanning (potential cycling) of platinum-palladium alloy catalysts. This method is described to be able to improve activity and durability of the platinum-palladium alloy catalysts.

Patent Literature 1 describes bringing platinum-palladium-containing catalyst particles into contact with an acid solution thereby dissolving the easily soluble palladium and causing platinum to precipitate on (111) surface of palladium appearing on their outmost surfaces in order to obtain catalyst particles with high durability (less elution of platinum).

CITATION LIST

Patent Literature

[Patent Literature 1] JP-A-2013-13878

Non-Patent Literature

[Non-Patent Literature 1] Electrochimica Acta 103 (2013) 66-76

SUMMARY OF THE INVENTION

Technical Problem

However, it is difficult to treat a large amount of platinum-palladium alloy catalysts by the method described in Non-Patent Literature 1, which is thus not suited on an industrial basis. Meanwhile, the method described in Patent Literature 1 still needs to be improved in terms of improving catalyst activity.

The present invention, made in view of the problems associated with those conventional techniques, has an object of providing a method for producing a platinum alloy-containing fuel cell electrode catalyst with high activity which is suited for its industrial mass-production.

Technical Solution

The present invention concerns, for example, [1] to [5] described below.

[1] A method for producing a fuel cell electrode catalyst comprising:
a step of preparing a dispersion in which a fuel cell electrode catalyst precursor comprising a platinum alloy (namely, alloy comprising platinum and other metal element(s)) is dispersed in an electrolyte solution, and
a step of alternately subjecting the dispersion to bubbling with an oxidizing gas and to bubbling with an inert gas or a reducing gas.

[2] The method for producing a fuel cell electrode catalyst described in the above [1], wherein the electrolyte solution is an aqueous sulfuric acid solution, an aqueous perchloric acid solution, hydrochloric acid or an aqueous nitric acid solution.

[3] The method for producing a fuel cell electrode catalyst described in the above [1] or [2], wherein the oxidizing gas is an oxygen gas or air.

[4] The method for producing a fuel cell electrode catalyst described in any one of the above [1] to [3], wherein the inert gas or the reducing gas is an inert gas.

[5] The method for producing a fuel cell electrode catalyst described in the above [4], wherein the inert gas is nitrogen gas.

Effects of the Invention

According to the present invention, a platinum alloy-containing fuel cell electrode catalyst with high activity can be produced, and can be mass-produced on an industrial basis.

DESCRIPTION OF EMBODIMENTS

Hereinafter, the present invention will be described in more detail.

The method for producing a fuel cell electrode catalyst according to the present invention comprises:
a step of preparing a dispersion in which a fuel cell electrode catalyst precursor containing a platinum alloy is dispersed in an electrolyte solution (hereinafter also referred to as the "dispersion preparation step"), and
a step of alternately subjecting the dispersion to bubbling with an oxidizing gas and to bubbling with an inert gas or a reducing gas (hereinafter also referred to as the "bubbling step").

(Dispersion Preparation Step)

In the dispersion preparation step, a dispersion in which an electrode catalyst precursor is dispersed in an electrolyte solution is prepared.

The electrode catalyst precursor may be a conventional platinum alloy-containing fuel cell electrode catalyst, which may be a fuel cell electrode catalyst composed of a platinum alloy, or may be a fuel cell electrode catalyst of supported type in which the catalyst composed of a platinum alloy is supported on a carrier.

The fuel cell electrode catalyst of supported-type preferred in terms of giving catalysts with high activity is such that platinum alloy particles supported have an average particle diameter of 2 nm to 10 nm and the platinum alloy accounts for 20 to 80 mass % of the fuel cell electrode catalyst of supported-type.

The average particle diameter is a value measured, for example, by analysis and the like of TEM images.

The platinum alloy is composed of a platinum element and other metal element(s). Said other metal element(s) may be a noble metal element or may be a non-noble metal element. Examples of the noble metal include gold, silver, ruthenium, rhodium, palladium, osmium and iridium, with ruthenium and palladium being preferable in terms of giving catalysts with high activity.

Examples of the non-noble metal include titanium, zirconium, hafnium, vanadium, niobium, tantalum, chromium, manganese, iron, cobalt, nickel, copper and zinc. Iron, cobalt and nickel, i.e., iron-group elements, are preferable in terms of giving catalysts with high activity. The platinum alloy may contain three or more kinds of metal elements including a platinum element.

The platinum alloy contains platinum and other metal element (s), for example, at a molar ratio of platinum:other metal element(s)=1:0.1 to 10. The component ratio (molar ratio) is adjusted preferably so as to give catalysts with high activity. In a platinum-palladium alloy preferred, for example, Pt:Pd=1:0.5 to 0.8; and in a platinum-cobalt alloy preferred, Pt:Co=1:0.2 to 0.4.

Examples of the carrier are carbon particles and particles composed of a heat-treated product, the heat-treated product being described in JP-A-2013-116458 and containing, as constituent elements, a Group 4 or Group 5 transition metal element, carbon, nitrogen and oxygen (molar ratios of the constituent elements expressed as the transition metal element:carbon:nitrogen:oxygen=1:x:y:z are preferably $0<x\leq7$, $0<y\leq2$ and $0<z\leq3$). The heat-treated product may contain at least one kind selected from iron, nickel, chromium, cobalt, vanadium and manganese. The heat-treated product can be produced, for example, by a method including mixing a transition metal compound (1) (part or whole of which is a compound of a transition metal element of Group 4 or Group 5 of the periodic table), a nitrogen-containing organic compound (2), wherein at least one of the compound (1) and the compound (2) has an oxygen atom, and a solvent with one another; removing the solvent; and then heat-treating the resultant solid residues at 500 to 1100° C.

The electrolyte solution is unlimited as long as being a solution in which an electrolyte is dissolved, and may be acidic, neutral or alkaline. However, the electrolyte solution is preferably an acidic solution, with its examples including an aqueous sulfuric acid solution, an aqueous nitric acid solution, hydrochloric acid and an aqueous perchloric acid solution. In terms of making it difficult for ions of electrolyte to adsorb onto surfaces of catalyst particles, preferred are an aqueous sulfuric acid solution, an aqueous nitric acid solution and an aqueous perchloric acid solution; and more preferred are an aqueous sulfuric acid solution and an aqueous perchloric acid solution.

The electrolyte solution may be an aqueous solution or a non-aqueous solution as long as being a solution in which an electrolyte can be dissolved and the fuel cell electrode catalyst precursor can be dispersed. In view of easiness of handling and inducing less side reaction caused by the fuel cell electrode catalyst precursor to a solvent, the electrolyte solution is preferably aqueous.

The concentration of the electrode catalyst precursor in the dispersion is, for example, 1 to 80 mass %.

A method for dispersing the electrode catalyst precursor in the electrolyte solution is not particularly limited as long as making it possible for the fuel cell electrode catalyst precursor to be sufficiently dispersed so as to prevent, in the bubbling step, the settlement of the fuel cell electrode catalyst precursor and the formation of large agglomerated particles. Exemplary methods are stirring with a stirrer and dispersing using a ball mill or a homogenizer.

(Bubbling Step)

In the bubbling step, the dispersion is alternately subjected to bubbling with an oxidizing gas and to bubbling with an inert gas or a reducing gas. The bubbling with an oxidizing gas may be performed first, or the bubbling with an inert gas or a reducing gas may be performed first.

This step is carried out in order to place surfaces of the platinum alloy under atmosphere causing the surfaces to be oxidized and to be reduced (non-oxidized) alternately. The whole of the surfaces of the platinum alloy at the time of conducting this step does not necessarily need to have been oxidized or does not necessarily need to have been reduced, and thus part of the surface of the platinum alloy is allowed to have been oxidized or is allowed to have been reduced.

In use of the fuel cell electrode catalyst precursor having the platinum alloy which has been oxidized:

if bubbling with an oxidizing gas is performed first, it is preferred that bubbling subsequent thereto be at least one time of cycle including bubbling with an inert gas or a reducing gas and bubbling with an oxidizing gas; and if bubbling with an inert gas or a reducing gas is performed first, it is necessary that bubbling subsequent thereto be at least one time of bubbling with an oxidizing gas.

In use of the fuel cell electrode catalyst precursor having the platinum alloy which has been reduced;

if bubbling with an oxidizing gas is performed first, it is necessary that bubbling subsequent thereto be at least one time of bubbling with an inert gas or a reducing gas; and if bubbling with an inert gas or a reducing gas is performed first, it is preferred that bubbling subsequent thereto be at least one time of cycle including bubbling with an oxidizing gas and bubbling with an inert gas or a reducing gas.

Effects to be exhibited by the gases used at bubbling treatment on the platinum alloy metal will be described below.

Using the oxidizing gas causes the oxidizing gas to be adsorbed on surfaces of the platinum alloy, and increases a surface potential of the platinum alloy contained in the electrode catalyst precursor, resulting in oxidization of the surfaces of the platinum alloy. If the platinum alloy has already been oxidized at the time of using the oxidizing gas, the oxidation proceeds further.

On the other hand, using the inert gas or the reducing gas decreases a surface potential of the platinum alloy, and reduces an oxidized surface of the platinum alloy. If the platinum alloy has already been reduced at the time of using the inert gas or the reducing gas, using the inert gas or the reducing gas has no effect on the reduced surface of the platinum alloy, but is allowed to be carried out because of for example removing slightly remaining oxides thereby adjusting the surface.

Carrying out the bubbling as described above can increase catalyst activity of the electrode catalyst precursor, though its reason is not definite.

Bubbling with the oxidizing gas is carried out until the difference in potential of the electrode catalyst precursor, which is defined as Potential of the electrode catalyst precursor given after bubbling—Potential of the electrode catalyst precursor given before starting bubbling, is preferably not less than 0.03 V, the potential of the electrode catalyst precursor being measured in a manner described below.

Bubbling with the inert gas or the reducing gas is carried out until the difference in potential of the electrode catalyst precursor, which is defined as Potential of the electrode catalyst precursor given after bubbling—Potential of the electrode catalyst precursor given before starting bubbling, is preferably not more than −0.03 V, the potential of the electrode catalyst precursor being measured in a manner described below.

(Method for Measuring Potential of Electrode Catalyst Precursor)

The catalyst precursor particles, a NAFION (registered trademark) solution (DE521, DuPont) with a concentration of 5 mass %, and water, after mixed with each other, are ultrasonically irradiated, to prepare a catalyst precursor ink. The catalyst precursor ink in an amount of 20 µl is dropwise added on a disk-shaped glassy carbon electrode (area: 0.196 cm$^2$), and naturally dried, so that an electrode is obtained.

The electrode, together with a standard hydrogen electrode as a reference electrode, is placed in the above-mentioned dispersion, to thereby measure potential of the electrode.

Examples of the oxidizing gas include oxygen gas and ozone gas, with oxygen gas being preferable in terms of being easily producible industrially and giving less environmental burden even in its use in large amount. The oxidizing gas may be supplied as a mixed gas (for example, air) that has been diluted with an inert gas.

Examples of the inert gas include nitrogen gas and a rare gas (argon gas or the like), with nitrogen gas being preferable from the viewpoints such as easy availability.

Examples of the reducing gas include hydrogen gas and carbon monoxide gas. The reducing gas may be supplied as a mixed gas formed with an inert gas.

Amount of any of the gases to be supplied for the bubbling (hereinafter also referred to as the "bubbling gases") is unlimited as long as giving the above-described potential difference: the amount is, for example, 20 to 200 mL/min per 100 mL of the dispersion.

Temperature of the dispersion in carrying out the bubbling step is, for example, 20 to 90° C. In terms of increasing gas diffusion and accelerating the variation of potential of the catalyst precursor particles as well as producing the catalyst with high activity in a shorter period of time, the temperature of the dispersion is preferably 40 to 80° C.

A period of time during which bubbling with each gas is performed (namely, a period of from starting to bubble with the oxidizing gas until before starting to bubble with the inert gas or the reducing gas, or a period of from starting to bubble with the inert gas or the reducing gas until before starting to bubble with the oxidizing gas) is, for example, 5 to 30 minutes. If the period of time for bubbling is relatively short, prolonging said period of time enhances the activity of the resultant catalyst.

In the bubbling step, advantageous effects are attained by conducting one time of cycle which includes one time of bubbling with the oxidizing gas and one time of bubbling with the inert or the reducing gas. That cycle may be conducted multiple times.

The cycle is conducted, for example, 1 to 50 times, preferably 3 to 30 times. In case of conducting the cycle a relatively few number of times, the more times the cycle is repeated, the higher activity the catalyst comes to have.

The above bubbling, followed by filtration and drying, may be further followed by heat treatment. An exemplary atmosphere at the time of the heat treatment is an inert gas or a mixed gas of 4% hydrogen and an inert gas. Temperature and period of time for the heat treatment are not particularly limited: however, in terms of preventing agglomeration of the catalyst particles, preferred are a treatment temperature of 150° C. to 800° C. and a treatment period of time of 20 minutes to 5 hours.

The fuel cell electrode catalyst produced by the production method according to the present invention can be used for a fuel cell catalyst layer of either an anode catalyst layer or a cathode catalyst layer.

The fuel cell catalyst layer according to a preferred embodiment further contains electron conductive powder and a polymer electrolyte. As these components, conventionally-used ones may be used with no particular limitation.

Further, the fuel cell catalyst layer can be used as a catalyst layer of a cathode and/or an anode provided in an electrode of a membrane electrode assembly of the polymer electrolyte fuel cell.

In the membrane electrode assembly, the electrode has the fuel cell catalyst layer and a porous support layer (gas diffusion layer). As the porous support layer (gas diffusion layer), conventional ones used in fuel cell catalyst layers may be used with no particular limitation.

As an electrolyte membrane possessed by the membrane electrode assembly, conventional ones used in fuel cell catalyst layers may be used with no particular limitation.

The membrane electrode assembly is used for fuel cells, preferably for polymer electrolyte fuel cells.

EXAMPLES

Hereinafter, the present invention will be more specifically described with reference to Examples, but the present invention is not limited by these Examples.

[Evaluation Method]
Evaluation of Potential of Catalyst Precursor:

The catalyst precursor particles prepared in Production Example, a NAFION solution (DE521, DuPont) with a concentration of 5 mass %, and water, after being mixed with one another, were ultrasonically irradiated, to give a catalyst precursor ink. The catalyst precursor ink in an amount of 20 µl was dropwise added on a disk-shaped glassy carbon electrode (area: 0.196 cm$^2$) and naturally dried, to give an electrode. Amount of the catalyst precursor particles had been adjusted such that a total amount of Pd and Pt on the electrode was 33 µg/cm$^2$.

In each of Examples and Comparative Examples, the above electrode, together with a standard hydrogen electrode as a reference electrode, was placed in the dispersion. Then, variation of potential of the above electrode associated with the bubbling with gases was measured.

Evaluation of Catalyst Activity:

The catalyst particles prepared in Example or Comparative Example, a NAFION solution with a concentration of 5 mass % (DE521, DuPont), and water, after being mixed with one another, were ultrasonically irradiated, to prepare a catalyst ink. The catalyst ink in an amount of 20 µl was dropwise added on a disk-shaped glassy carbon electrode (area: 0.196 cm$^2$), and naturally dried, to give an electrode. Amount of the catalyst particles had been adjusted such that a total amount of Pd and Pt on the electrode was 33 µg/cm$^2$.

Reference electrode: reversible hydrogen electrode (RHE)
Counter electrode: Pt wire
Electrolyte solution: an aqueous solution of 0.5 M $H_2SO_4$
(before starting the measurement, the electrolyte solution had been
saturated with oxygen over a period of 1 hour.)
Rotation speed: 600 rpm
Measurement voltage range: 1.1 V to 0.3 V
Scanning rate: 5 mV/s
Obtained data were standardized by using an equation as follows.

$$i_k = (i_d \cdot i)/(i \cdot i_d)$$

wherein $i_k$ indicates a standardized density (μA/cm²), i indicates a density of current at 0.9V (μA/cm²), and $i_d$ indicates a density of diffusion current (μA/cm²).

The larger value of $i_k$ is, the higher oxygen reduction activity is.

Production Example 1

Production of Fuel Cell Catalyst Precursor:

To 500 mL of water, 0.4 g of a carbon black carrier as a carrier powder (Ketjen black EC600JD, manufactured by Ketjen Black International Co., Ltd.) was added. These were stirred in a water bath at 40° C. for 30 minutes. To the resultant dispersion, 56.6 ml of an aqueous solution of $(NH_4)_2PdCl_4$ (Pd concentration: 0.19 mass %) and 103.1 ml of an aqueous solution of $H_2PtCl_6$ (Pt concentration: 0.19 mass %) were added. The resultant mixture was stirred in the water bath at 40° C. for 6 hours. During the adding and stirring procedures, an aqueous solution of $Na_2CO_3$ (concentration: 4.2 mass %) was added to keep pH of the dispersion at 9.

The resultant dispersion was allowed to cool to room temperature (25° C.) and was filtered. Subsequently, the resultant solid was dried in an oven at 80° C. over a period of 12 hours. The resultant dried substance, after crushed with a mortar, was calcined in a quartz furnace in an atmosphere of a mixed gas of nitrogen gas and hydrogen gas (hydrogen gas concentration: 4 vol %) at 300° C. over a period of 2 hours, to give particles of support type in which particles containing Pd and Pt were supported (hereinafter also referred to as the "catalyst precursor particles").

Example 1-1

In 100 mL of an aqueous 0.5 M sulfuric acid solution, the catalyst precursor particles in an amount of 0.5 g were dispersed to prepare a dispersion. To the dispersion, bubbling with nitrogen gas was performed for 10 minutes, and subsequently bubbling with oxygen gas was performed for 10 minutes, and again nitrogen gas was bubbled for 10 minutes. In this way, the bubbling with nitrogen gas for 10 minutes and the bubbling with oxygen gas for 10 minutes were alternately repeated for a total of 1 hour under conditions described below. In the bubbling, the gases were caused to spout with a straight tube having an inner diameter of about 1 mm.

After the bubbling, the dispersion was subjected to suction-filtration using a filter with a pore diameter of 1 μm, to sufficient washing using pure water, and then to drying in an oven at 80° C. for 10 hours, to thereby produce a powdery fuel cell electrode catalyst.
Amount of nitrogen gas supplied: 50 mL/min
Amount of oxygen gas supplied: 50 mL/min
Temperature of dispersion: kept at 60° C. by using a water bath.

Variation of potential of the catalyst precursor in the bubbling step is shown in Table 1. Various conditions and evaluation results of the resultant catalyst are shown in Table 2.

Example 1-2

Example 1-1 was repeated except that the total period of time for bubbling with oxygen gas and bubbling with nitrogen gas was changed from 1 hour to 2 hours, so that a fuel cell catalyst was produced.

Variation of potential of the catalyst precursor in the bubbling step is shown in Table 1. Various conditions and evaluation results of the resultant catalyst are shown in Table 2.

Examples 2-1 and 2-2

Examples 1-1 and 1-2 were each repeated except that the catalyst precursor particles were changed from the catalyst precursor particles obtained in Production Example 1 to a commercially-available platinum-cobalt alloy/carbon carrier catalyst (TEC36EA52, manufactured by Tanaka Kikinzoku Kogyo), so that each fuel cell catalyst was produced.

Variation of potentials of the catalyst precursors in the bubbling step is shown in Table 1. Various conditions and evaluation results of the resultant catalysts are shown in Table 2.

Comparative Examples 1-1 to 1-3

Example 1-1 was repeated except that instead of alternately bubbling with oxygen gas and bubbling with nitrogen gas, only bubbling with oxygen gas was carried out for 1 hour, for 2 hours or for 5 hours respectively, so that each fuel cell catalyst was produced.

Variation of potentials of the catalyst precursors in the bubbling step is shown in Table 1. Various conditions and evaluation results of the resultant catalysts are shown in Table 2.

Comparative Examples 2-1 to 2-3

Example 1-1 was repeated except that instead of alternately bubbling with oxygen gas and bubbling with nitrogen gas, only bubbling with nitrogen gas was carried out for 1 hour, for 2 hours or for 5 hours respectively, so that each fuel cell catalyst was produced.

Variation of potentials of the catalyst precursors in the bubbling step is shown in Table 1. Various conditions and evaluation results of the resultant catalysts are shown in Table 2.

Reference Examples 1 and 2

Catalyst evaluation results of the catalyst precursor particles of Production Example 1 and of the platinum-cobalt alloy/carbon carrier catalyst (TEC36EA52, manufactured by TANAKA KIKINZOKU), which did not undergo bubbling step, are shown respectively as Reference Example 1 and Reference Example 2 in Table 2.

TABLE 1

Difference in Potential of Catalyst Precursor (Potential After Bubbling − Potential Before Bubbling) (V)

|  | Examples | | | | Comparative Examples | | | | | |
| --- | --- | --- | --- | --- | --- | --- | --- | --- | --- | --- |
|  | 1-1 | 1-2 | 2-1 | 2-2 | 1-1 | 1-2 | 1-3 | 2-1 | 2-2 | 2-3 |
| Initial potential[1] of catalyst precursor | 0.96 | 0.96 | 1.02 | 1.02 | 0.97 | 0.97 | 0.97 | 0.97 | 0.97 | 0.97 |
| Elapsed time[2] (hour:minute) | | | | | | | | | | |
| 0:10 | −0.04 | −0.04 | −0.03 | −0.04 | 0.03 | 0.03 | 0.03 | −0.04 | −0.04 | −0.04 |
| 0:20 | 0.03 | 0.05 | 0.04 | 0.04 | 0.04 | 0.04 | 0.04 | −0.05 | −0.05 | −0.05 |
| 0:30 | −0.05 | −0.04 | −0.05 | −0.04 | | | | | | |
| 0:40 | 0.06 | 0.07 | 0.06 | 0.06 | | | | | | |
| 0:50 | −0.04 | −0.05 | −0.05 | −0.05 | | | | | | |
| 1:00 | 0.06 | 0.06 | 0.05 | 0.06 | | | | | | |
| 1:10 | | −0.03 | | −0.04 | | | | | | |
| 1:20 | | 0.06 | | 0.06 | | | | | | |
| 1:30 | | −0.03 | | −0.04 | | | | | | |
| 1:40 | | 0.07 | | 0.07 | | | | | | |
| 1:50 | | −0.04 | | −0.05 | 0.05 | 0.05 | | | | |
| 2:00 | | 0.07 | | 0.07 | | | | | | |
| 5:00 | | | | | | | | | | |

[1]Initial potential of catalyst precursor: potential of catalyst precursor before bubbling
[2]Elapsed time: elapsed time from starting bubbling

TABLE 2

| | Catalyst precursor | | | Oxidizing gas | | Inert gas or Reducing gas | |
| --- | --- | --- | --- | --- | --- | --- | --- |
| | Average particle diameter [nm] | Percentage of platinum alloy [mass %] | Electrolyte solution | | Period of time [min] | Supplied amount [ml/min] | | Period of time [min] | Supplied amount [ml/min] |
| Example 1-1 | PdPt/carrier | 5 to 6 | 49 | Sulfuric acid | Oxygen | 10 | 50 | Nitrogen | 10 | 50 |
| Example 1-2 | PdPt/carrier | 5 to 6 | 49 | Sulfuric acid | Oxygen | 10 | 50 | Nitrogen | 10 | 50 |
| Reference Example 1 | PdPt/carrier | 5 to 6 | 49 | — | — | — | — | — | — | — |
| Example 2-1 | PtCo/carrier | 4 to 5 | 54 | Sulfuric acid | Oxygen | 10 | 50 | Nitrogen | 10 | 50 |
| Example 2-2 | PtCo/carrier | 4 to 5 | 54 | Sulfuric acid | Oxygen | 10 | 50 | Nitrogen | 10 | 50 |
| Reference Example 2 | PtCo/carrier | 4 to 5 | 54 | — | — | — | — | — | — | — |
| Comparative Example 1-1 | PdPt/carrier | 5 to 6 | 49 | Sulfuric acid | Oxygen | 10 | 50 | — | — | — |
| Comparative Example 1-2 | PdPt/carrier | 5 to 6 | 49 | Sulfuric acid | Oxygen | 10 | 50 | — | — | — |
| Comparative Example 1-3 | PdPt/carrier | 5 to 6 | 49 | Sulfuric acid | Oxygen | 10 | 50 | — | — | — |
| Comparative Example 2-1 | PdPt/carrier | 5 to 6 | 49 | Sulfuric acid | — | — | — | Nitrogen | 10 | 50 |
| Comparative Example 2-2 | PdPt/carrier | 5 to 6 | 49 | Sulfuric acid | — | — | — | Nitrogen | 10 | 50 |
| Comparative Example 2-3 | PdPt/carrier | 5 to 6 | 49 | Sulfuric acid | — | — | — | Nitrogen | 10 | 50 |

| | Bubbling temperature [° C.] | Total period of time for bubbling [hour(s)] | Number of bubbling cycles [times] | $i_K$ [mA/cm$^2$] |
| --- | --- | --- | --- | --- |
| Example 1-1 | 60 | 1 | 3 | 0.52 |
| Example 1-2 | 60 | 2 | 6 | 0.56 |
| Reference Example 1 | — | 0 | 0 | 0.23 |
| Example 2-1 | 60 | 1 | 3 | 0.74 |
| Example 2-2 | 60 | 2 | 6 | 0.79 |
| Reference Example 2 | — | 0 | 0 | 0.63 |
| Comparative Example 1-1 | 60 | 1 | — | 0.33 |
| Comparative Example 1-2 | 60 | 2 | — | 0.39 |

TABLE 2-continued

| | | | | |
|---|---|---|---|---|
| Comparative Example 1-3 | 60 | 5 | — | 0.44 |
| Comparative Example 2-1 | 60 | 1 | — | 0.33 |
| Comparative Example 2-2 | 60 | 2 | — | 0.39 |
| Comparative Example 2-3 | 60 | 5 | — | 0.47 |

Table 2 demonstrates that Examples provided catalysts with higher activity by conducting bubbling.

On the other hand, Comparative Examples, where bubbling with oxygen gas alone or bubbling with nitrogen gas alone was conducted, failed to provide catalysts with activity as high as Examples, even though the bubbling was conducted for as long as Examples.

The invention claimed is:

1. A method for producing a fuel cell electrode catalyst comprising:
   a step of preparing a dispersion in which a fuel cell electrode catalyst precursor comprising a platinum alloy is dispersed in an electrolyte solution, and
   a step of alternately subjecting the dispersion to bubbling with an oxidizing gas and to bubbling with an inert gas or a reducing gas.

2. The method for producing a fuel cell electrode catalyst described in claim 1, wherein the electrolyte solution is an aqueous sulfuric acid solution, an aqueous perchloric acid solution, hydrochloric acid or an aqueous nitric acid solution.

3. The method for producing a fuel cell electrode catalyst described in claim 1, wherein the oxidizing gas is an oxygen gas.

4. The method for producing a fuel cell electrode catalyst described in claim 1, wherein the inert gas or the reducing gas is an inert gas.

5. The method for producing a fuel cell electrode catalyst described in claim 4, wherein the inert gas is nitrogen gas.

6. The method for producing a fuel cell electrode catalyst described in claim 1, wherein the step of alternately subjecting the dispersion to bubbling with an oxidizing gas comprises subjecting the dispersion to bubbling with an oxidizing gas for at least 5 minutes so as to oxidize surfaces of the platinum alloy and to bubbling with an inert gas or a reducing gas for at least 5 minutes so as to reduce oxidized surfaces of the platinum alloy.

7. The method for producing a fuel cell electrode catalyst described in claim 1, wherein the platinum alloy contains platinum and one or more other metal elements in a molar ratio of platinum:other metal element(s)=1:0.1 to 10.

8. The method for producing a fuel cell electrode catalyst described in claim 1, wherein bubbling with the oxidizing gas is carried out until a difference in potential of the electrode catalyst precursor after bubbling is not less than 0.03 V.

9. The method for producing a fuel cell electrode catalyst described in claim 1, wherein bubbling with an inert gas or a reducing gas is carried out until a difference in potential of the electrode catalyst precursor after bubbling is not more than −0.03 V.

* * * * *